No. 692,234. Patented Feb. 4, 1902.
R. S. BROWN.
RECESSING MACHINE.
(Application filed Apr. 13, 1901.)
(No Model.) 7 Sheets—Sheet I.

Witnesses:

Inventor:
Robert S. Brown.
By his Attorney,

No. 692,234. Patented Feb. 4, 1902.
R. S. BROWN.
RECESSING MACHINE.
(Application filed Apr. 13, 1901.)
(No Model.) 7 Sheets—Sheet 2.

Fig. 2.

Witnesses:
Wm H. Blodgett
J. L. Edwards Jr.

Inventor:
Robert S. Brown.
By his Attorney
F. H. Richards.

No. 692,234. Patented Feb. 4, 1902.
R. S. BROWN.
RECESSING MACHINE.
(Application filed Apr. 13, 1901.)
(No Model.) 7 Sheets—Sheet 3.

Witnesses:

Inventor:
Robert S. Brown.
By his Attorney,
F. H. Richards.

No. 692,234. Patented Feb. 4, 1902.
R. S. BROWN.
RECESSING MACHINE.
(Application filed Apr. 13, 1901.)
(No Model.) 7 Sheets—Sheet 4.

Witnesses:

Inventor,
Robert S Brown,
By his Attorney.

THE NORRIS PETERS CO., PHOTO-LITHO., WASHINGTON, D. C.

No. 692,234. Patented Feb. 4, 1902.
R. S. BROWN.
RECESSING MACHINE.
(Application filed Apr. 13, 1901.)

(No Model.) 7 Sheets—Sheet 5.

Witnesses.
Inventor:
Robert S. Brown.
By his Attorney,

No. 692,234. Patented Feb. 4, 1902.
R. S. BROWN.
RECESSING MACHINE.
(Application filed Apr. 13, 1901.)
(No Model.) 7 Sheets—Sheet 6.

Witnesses:
Wm H. Blagett
J. L. Edwards Jr.

Inventor:
Robert S. Brown.
By his Attorney
F. H. Richards.

No. 692,234.  
R. S. BROWN.  
RECESSING MACHINE.  
(Application filed Apr. 13, 1901.)  
Patented Feb. 4, 1902.

(No Model.)  
7 Sheets—Sheet 7.

Witnesses:  
J. L. Edwards Jr.  
Wm. H. T. [signature]

Inventor:  
Robert S. Brown.  
By his Attorney,  
J. H. Richards.

UNITED STATES PATENT OFFICE.

ROBERT S. BROWN, OF NEW BRITAIN, CONNECTICUT.

RECESSING-MACHINE.

SPECIFICATION forming part of Letters Patent No. 692,234, dated February 4, 1902.

Application filed April 13, 1901. Serial No. 55,629. (No model.)

*To all whom it may concern:*

Be it known that I, ROBERT S. BROWN, a citizen of the United States, residing in New Britain, in the county of Hartford and State of Connecticut, have invented certain new and useful Improvements in Recessing-Machines, of which the following is a specification.

My invention relates to a machine for recessing wood, and while, with slight modifications, capable of use in various ways is more particularly designed for producing hinge-butt recesses in door-stiles, blinds, or other articles.

Primarily the object of the invention is the production of a machine which will form recesses in wooden strips or bars and which will produce these recesses of the desired length, width, and depth.

A further object of the invention is the provision in a machine of the class described of adjustable scoring knives or cutters for penetrating the wood to or below the desired depth to which the recess is to be formed and in connection with said cutters the provision of means for removing the material scored or incised by the cutters just set forth, whereby recesses of the dimensions desired may readily be formed.

A further object of the invention is the provision of marking tools or prods for indenting or recessing the wood at the points where the screws are to be inserted for securing the leaves of hinge-butts or other devices.

A further object of the invention is the provision of strippers for removing chips or pieces cut from the wood by the knives or cutters.

A further object of the invention is the provision of improved devices for holding the work.

A further object of the invention is the provision of improved means for actuating the various parts of the machine in proper sequence and for advancing the work to the position where it will be operated upon in sequential order by the various tools.

A further object of the invention is the provision of interchangeable tools and of means for securing and adjusting said tools, whereby recesses of the desired length, width, depth, and contour may be formed in the material to be operated upon.

In the accompanying drawings.

Similar numerals designate similar parts throughout the several views.

Prefacing the description of the invention it is desired to state that while the invention is shown embodied in a single machine it is distinctly to be understood that it is not limited thereto, for it may be employed in a gang-machine in which a series of tools will be arranged side by side adjacent to each other without departure from the scope thereof.

Ordinarily metallic hinge-butts are, according to trade custom, swaged or pressed together at the joints, so that when closed each leaf of the butt will touch the opposite leaf over its entire surface, and it needs but a slight recess of the thickness of the stock in each leaf to receive the butt flush with the surface of the material. In the trade custom, however, with brass butts it is usual to have the leaf depart from the circle of the joint tangentially, and such butts therefore require a somewhat-deeper recess in the material (of about half the diameter of the joints of the butt in depth) in order that the two pieces attached to the leaves may come fairly together when the hinges are swung, and in my machine both kinds of recesses may readily be formed.

Referring to the drawings, the numeral 5 designates the frame of the machine, which may be of any desired form necessary to support the cam-shaft and other working parts thereof, and this frame in the construction shown is mounted upon the top of a column or standard 6, carrying at its lower end treadle or lever mechanism by which the work-supporting table is actuated. This frame may, however, be of any desired form, and the invention is not limited to that shown.

Rising from the base-plate 5' of the frame 5 are standards 8, in which is journaled a driving-shaft 9, carrying at one end a fly-wheel 10 and at its opposite extremity a fast pulley 12 and a loose pulley 13. Laterally projecting from the side bar 18' of the frame is a bracket 14, in which is pivoted a lever 15, the latter being connected at its rear end to a rod 16, mounted for sliding movement in bearings 17 17' of the side bars 18 18', and to the end of said rod opposite to that to which the lever 15 is connected is secured by a screw or otherwise a sleeve 19, carrying forks 20 and 20', which shift the belt from one pulley to another pulley when required. The side bars 18 18' rise from the standards 8 and project across the top of the frame and are united adjacent to their front and rear ends by tie-bolts and sleeves 21 and 22, respectively, to afford stability, and said side bars are provided with bearings 23 24 at their overhanging front ends to receive a rod or shaft 25 for a purpose hereinafter stated.

Figure 1:
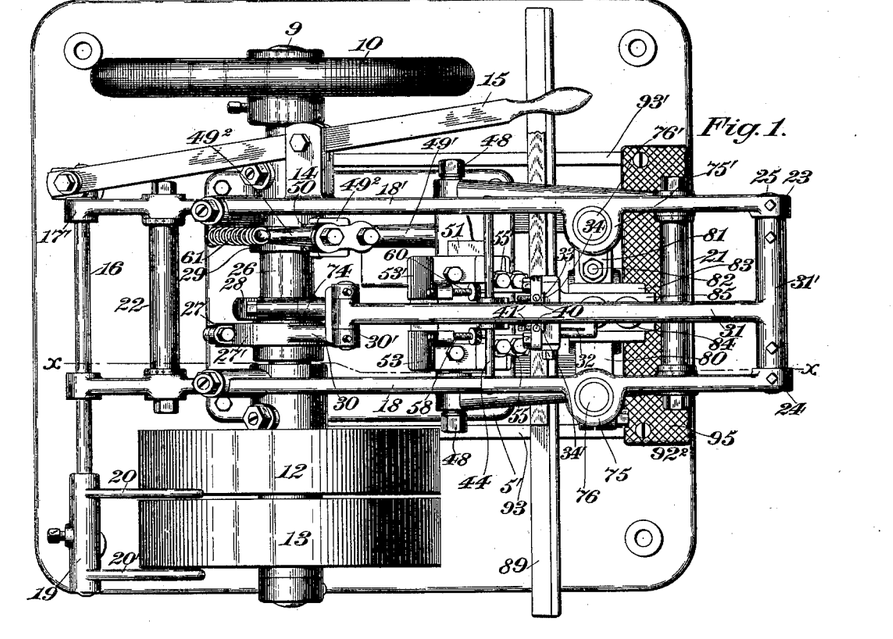
Figure 1 is a plan view of the machine.
Figure 2:
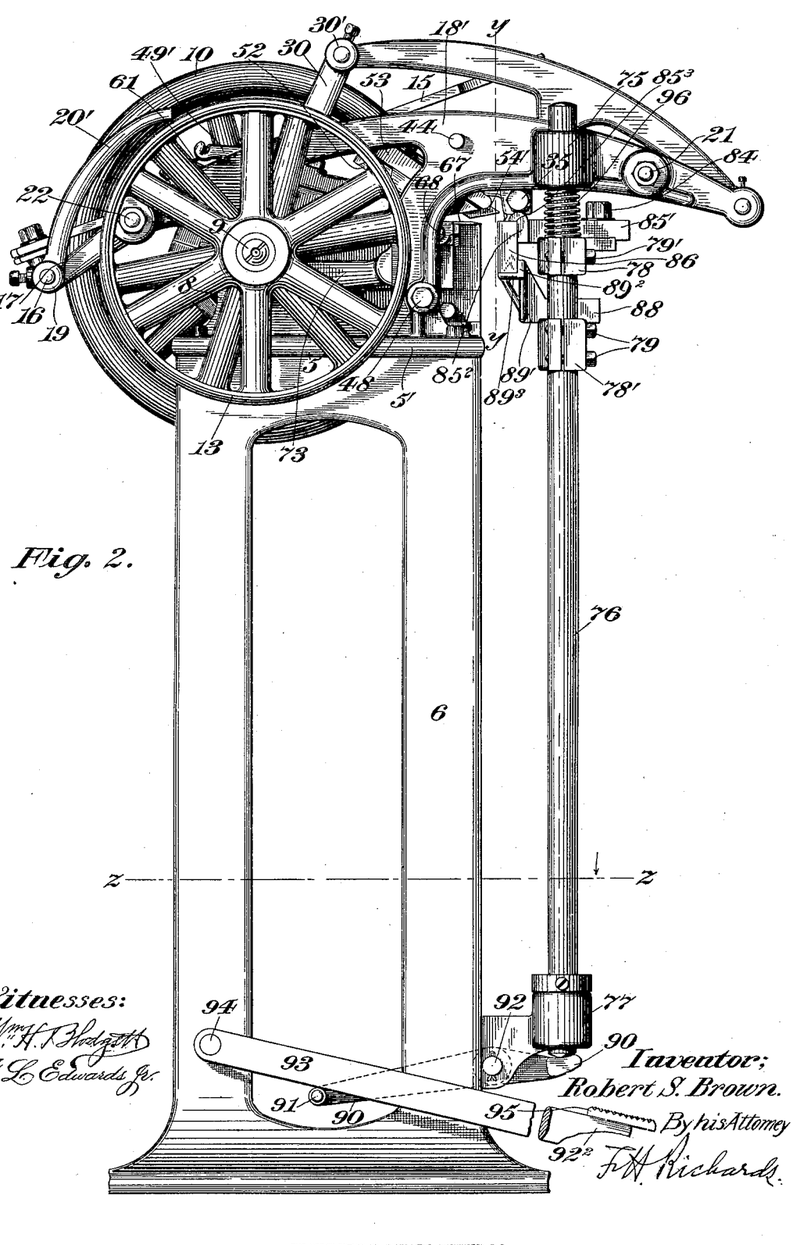
Fig. 2 is a side elevation of the machine.
Figure 3:
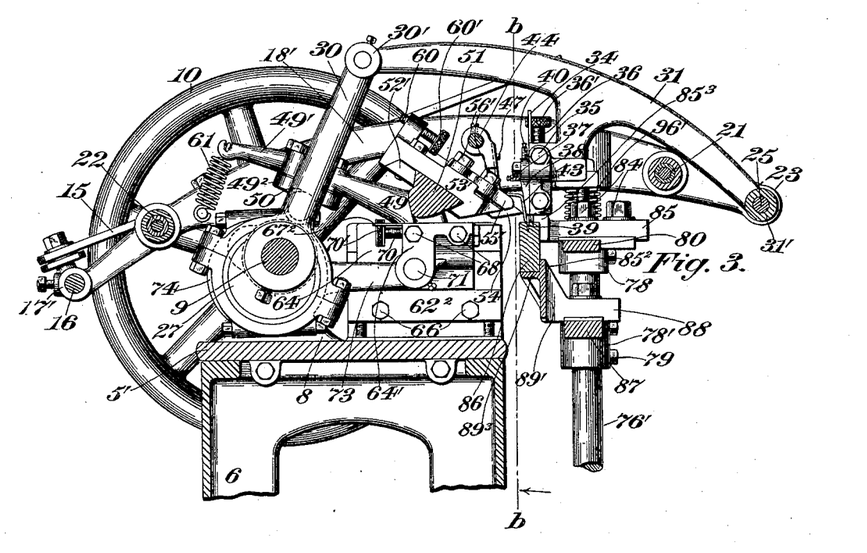
Fig. 3 is a transverse vertical section of the upper part of the machine, taken on line $x\ x$, Fig. 1, showing the slicing-knife and the end scoring or incising knives withdrawn, the prods or indenting-points and the side scoring-knife being represented as located within the material.
Figure 4:
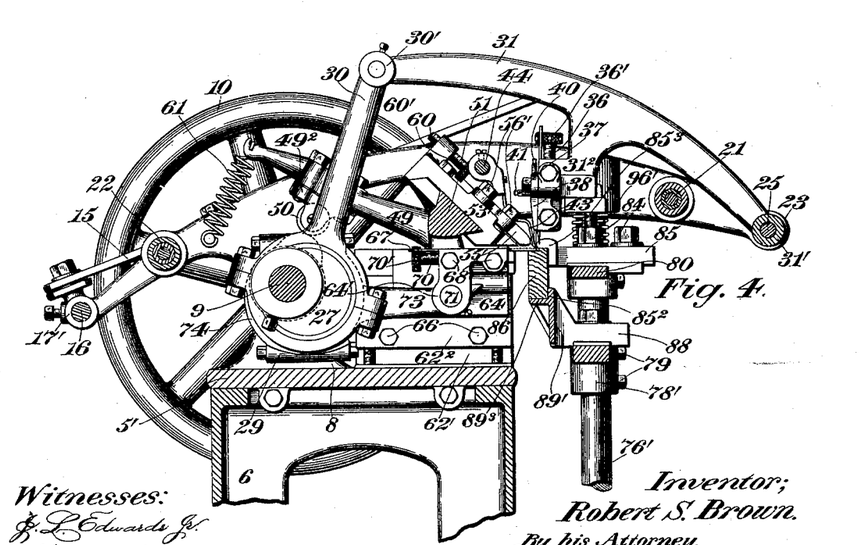
Fig. 4 is a view similar to Fig. 3, showing the prods or marking-points and the side scoring-knife withdrawn and the slicing and end scoring or incising knives in operation.
Figures 5, 6:
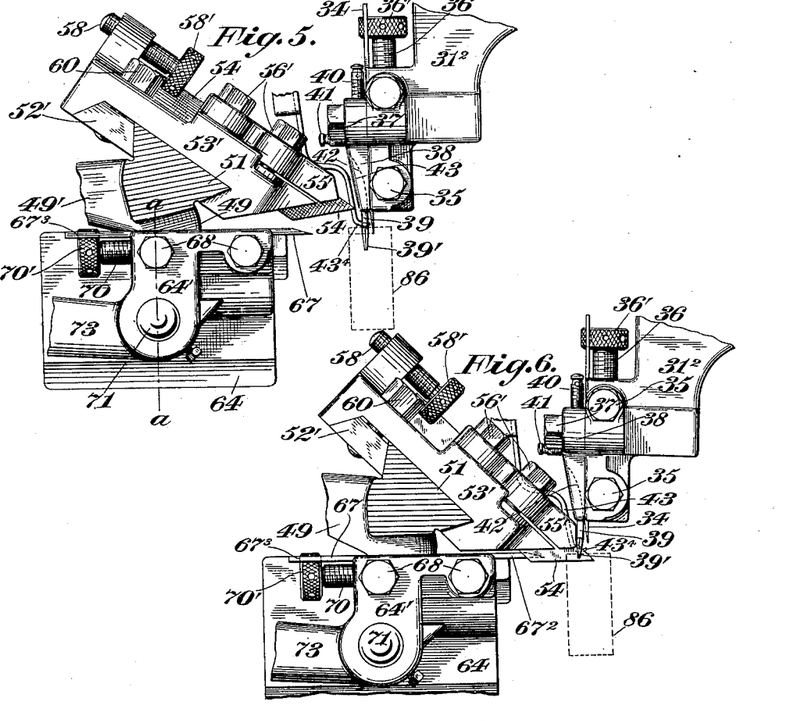
Fig. 5 is a detail view, partially in section, representing in side elevation the positions of the various tools at the time the work is forced forward.
Fig. 6 is a detail view similar to Fig. 5, representing one of the knives for scoring or incising the wood at the end wall of the recess to be formed in operation, the slicing-knife, indenting prods or markers, and the front scoring-knife being withdrawn.
Figure 7:
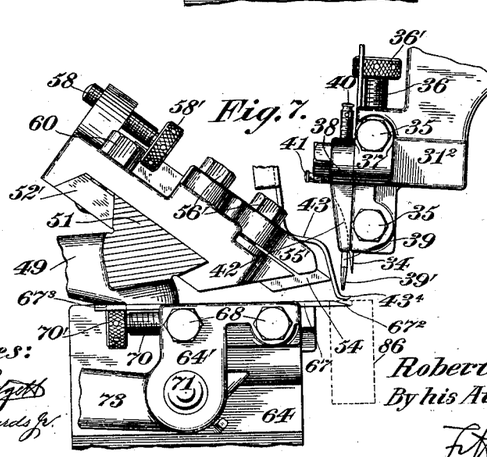
Fig. 7 is a view similar to Figs. 5 and 6, representing the scoring or incising knives and the marking points or prods out of operation and the slicing-knife in the act of removing the material to the required depth from between the points incised by the end and the front scoring knives or cutters.
Figure 8:
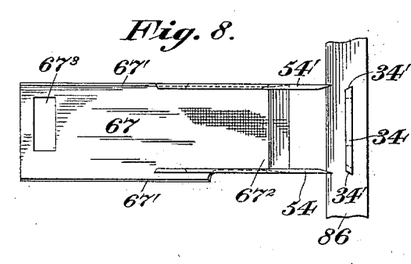
Fig. 8 is a plan view of the slicing-knife and knives for incising the wood or other material at the ends of the portion in which the recess is to be formed.

Secured to the driving-shaft 9, between two of the standards 8, is a sleeve 26, which is provided near one end with a pair of reversely-set eccentrics (designated, respectively, by the numerals 27 and 28) and at its opposite extremity with a cam 29. Projecting from the strap 27' of eccentric 27 is a rod 30, which is articulated at its upper end at 30' to a lever 31, provided at its forward end with a sleeve 31', which is located between the ears or bearings 23 and 24 of the side frames 18 18' and is mounted for swinging movement upon the rod or bolt 25, uniting the free overhanging ends of said side frames, as shown in Figs. 1, 2, and 3. This lever is provided with a head, and said head is preferably split at 32 and is formed on its face with a channel 33, preferably having inclined side walls for the reception of a knife or cutter 34, having beveled edges 34', and which I term the "front scorer," said knife or cutter serving to incise or score the material to determine the length and depth of the recess to be formed therein. This front scoring-knife has a blade or working end of a width corresponding to the length of the recess to be formed, and it is clamped in position by a pinch-screw 35, working in the head $31^2$, as illustrated in Fig. 10.

Figure 12:
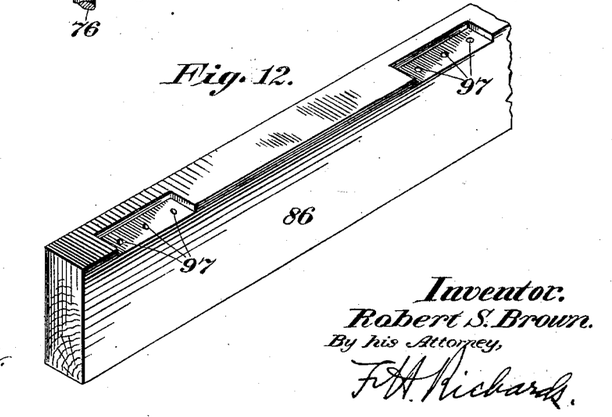
Fig. 12 is a perspective view of a door-stile in which recesses have been formed by the machine.
Figure 13:
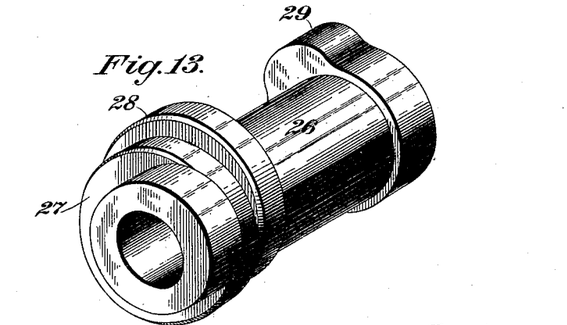
Fig. 13, Sheet 1, is a perspective view of a cam-sleeve carried by the main shaft.
Figures 14, 15, 16:
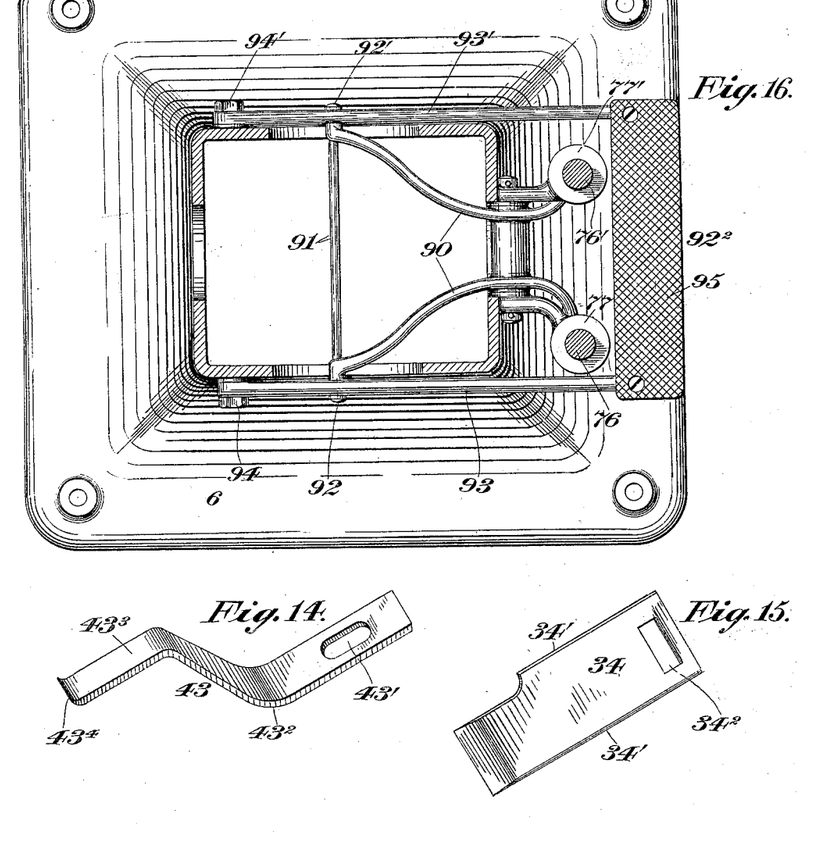
Fig. 14 is a perspective view of one of the strippers.
Fig. 15 is a perspective view of the knife or front scorer for incising the wood.
Fig. 16 is a section on line $z\ z$, Fig. 2.

To enable recesses of varying lengths to be made by the machine, a series of interchangeable front scoring-knives is provided, each having a different width of beveled or other form of cutting edge, the reduced widths of the knives being formed by grinding off or otherwise reducing the edges of said knives at 34', as illustrated in Fig. 15. Each of these scoring-knives is slotted at $34^2$ for the reception of the head 36' of a screw 36, threaded into the head $31^2$, whereby the screw may be turned positively to adjust the knife back and forth to cause it to sink into the material to the depth desired and whereby the knife is prevented from dropping should the side lock become loose and from becoming damaged or injuring other knives or parts of the machine. Secured by screws 37 to the head $31^2$ in front of the scoring-knife 34 is a block 38, and this block is perforated longitudinally to receive a series of (preferably three, although a different number may be employed) prods or marking-tools 39, which enter the material and form at the desired distance apart therein small holes or recesses 97 (see Fig. 12) for receiving the points of the screws employed to secure the hinges in place. These prods or marking-tools have points 39' of chisel-like form in a direction lying across the grain of the wood, so that when they enter the work they will not split the same.

Screws 40 are provided for adjusting each prod individually as to depth of penetration, and other screws 41, passing through the face of the block 38, rigidly secure said prods after adjustment. Other means may be substituted for those shown for adjusting and securing the prods or marking-tools without departure from the invention, and they may be positively adjusted back and forth, if desired.

Figure 9:
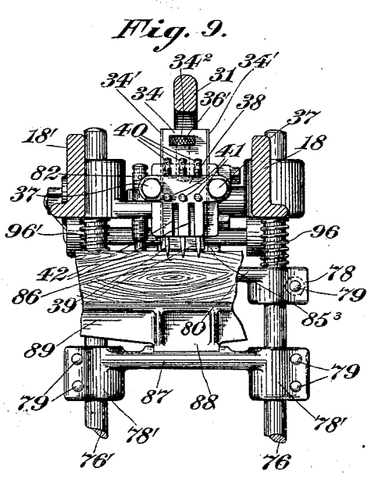
Fig. 9 is a front elevation, partially in section, of that part of the machine in which the marking points or prods are mounted, showing the manner in which said tools may be adjusted vertically to cause them to penetrate the material to the desired depth and also showing the grooves for the reception of the strippers, the section being taken on line $y\ y$, Fig. 2.
Figure 10:
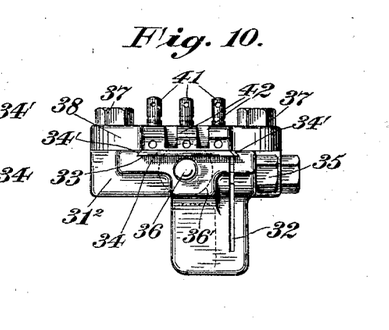
Fig. 10 is a detail view of the head carrying the marking tools or prods, showing the grooves for the strippers.

As will be seen by Figs. 9 and 10, the block 38 is provided with longitudinal grooves or recesses 42 between the prods or marking-tools, said recesses being provided for the purpose of receiving the ends of resilient strippers 43, which operate to clean out on each rise of the lever 31 the chips which would tend to wedge between the beveled edge of the front scoring-knife 34 and the prods or marking-tools 39. Two of these chip-strippers are employed, and, as shown in Fig. 14, each of said devices is alike and is composed of a bar of tool or equivalent steel slotted at $43'$, deflected, preferably, on a curved line at $43^2$ and having a depending end portion $43^3$, provided with a nose $43^4$.

Located transversely of the machine and secured in openings of the side bars 18 18' is a rod or shaft 44, to which are attached by screws 45 at the desired distance apart heads 46, having grooved front faces $46'$, in which the shanks of the strippers 43 are adjustably fastened by screws 47, which pass through the slots $43'$. By loosening these screws the strippers may be adjusted to bring the noses or working points $43^4$ to the desired position with relation to the work. It will be observed that the curved or deflected portions $43^2$ of these strippers normally tend to spring into the grooves 42 and to bear against the rear walls thereof, thereby carrying the points $43^4$ back of the prods and holding them there during the operation of the pivoted lever 31; but when said lever rises the working ends of the strippers will prevent chips which may have accumulated on the work and which if not removed would tend to wedge into the space between the beveled edge of the scoring-knife and the prods from being carried up by said prods.

Figures 11, 11A:
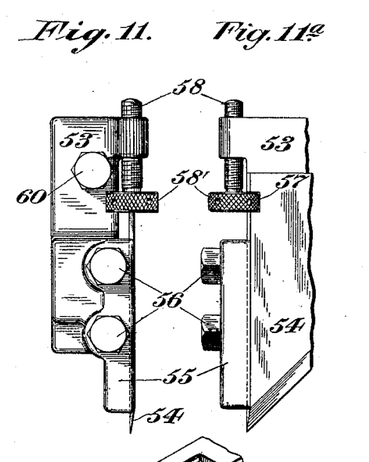
Fig. 11 is a plan view of one of the heads containing the side scoring-cutters.

Pivoted to the machine-frame on trunnions 48 is a lever 49 in the form of a bail-shaped casting and having a rearwardly-extending arm $49'$, provided on its under side with a bracket $49^2$, in which is journaled an anti-friction-roller 50, the latter bearing against the cam 29 of sleeve 26. This lever is provided with a transverse tongue or guideway 51, arranged as represented in Figs. 3 to 7, inclusive, which is preferably of dovetail form, and adjustably secured to this tongue or guideway by double-wedge gibs 52 $52'$ are heads 53 $53'$, in which the side scoring or incising knives 54 $54'$ are mounted. These knives are flat blades of steel, having their cutting edges at an inclination, so that when the lever is actuated by the cam 29 they will enter the material in a vertical line, and they are located edgewise in grooves of the heads and cap-plates 55 $55'$ secured to said heads by bolts 56 $56'$. Each knife is slotted at 57 for the reception of the knurled head $58'$ of a capstan-screw 58, the threaded shank of which enters a nut in the head, as more clearly shown in Figs. 11 and $11^a$, and by means of said screws the side scoring-knives may be positively adjusted back and forth to cause them to penetrate the material to the desired depth. By loosening the bolts 60, which actuate the double-wedge gibs 52 $52'$, the heads 53 $53'$ may be adjusted back and forth on the guideway 51 to set the knives to the desired distances apart, and in this way recesses of any desired length within the capacity of the machine may be marked off and incised preliminary to the action of the slicing-knife, which will hereinafter be described. A spring 61 or other device suitable for the purpose returns the lever 49 to its normal position after said lever has been actuated by the cam 29.

Figure 17:
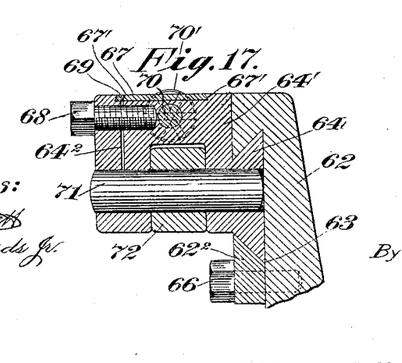
Fig. 17 is a section on line $a\ a$, Fig. 5.
Figure 18:
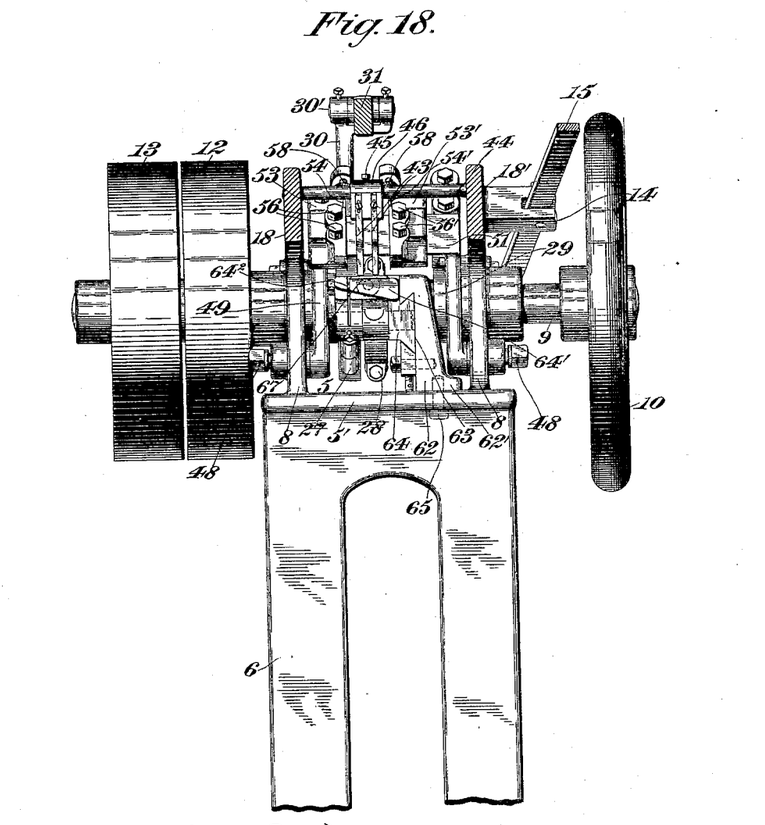
Fig. 18 is a section on line $b\ b$, Fig. 3, looking in the direction of the arrow.
Figure 19:
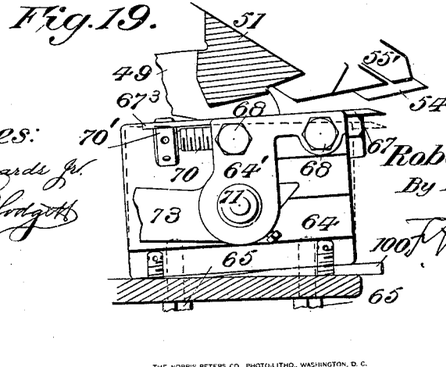
Fig. 19 is a detail view of means for adjusting the block in which the slicing-knife reciprocates.

Mounted on the bed-plate $5'$ is a block 62, provided with a guideway 63, preferably of dovetailed form, for the reception of a slide 64, (see Fig. 17,) and this block has a lateral flange $62'$, through which bolts 65 pass for securing it to said bed-plate. One side of the guideway is formed by an adjustable gib $62^2$, through slots in which bolts 66 pass for securing said gib in position when it has been adjusted by other bolts (not shown) to take up wear of the slide 64. From the slide 64 projects a lateral offset portion $64'$, which is split at $64^2$ and is provided with a groove in its face, having inclined side walls for the reception of a slicing-knife 67, having beveled edges $67'$, a reduced working end $67^2$ with a preferably beveled cutting-face, and a slot $67^3$ adjacent to its rear end. This slicing-knife is secured in its seat in the slide by bolts 68, which pass into threaded seats in the offset portion of the slide and force the split part of said slide against the edge of the knife or an interposed filling piece or shim 69, as shown in Fig. 17. For positively adjusting this slicing-knife back and forth a capstan-head screw 70 is employed, said screw having a knurled head $70'$, which enters the slot $67^3$.

Fitted on a rod or pin 71 of the slide 64 and located in a slot in the offset portion $64'$ of the slide is the eye 72 of a pitman 73, which is connected to the strap 74 of the eccentric 28 on sleeve 26 of the main driving-shaft 9, and by means of this eccentric the slide is reciprocated to cause the slicing-knife to enter the wood and remove the material from between the scores or incisions made by the side scoring-knives 54 $54'$ and the front scoring-knife 34. As will be observed, the slicing-knife 67 is of the same shape as the front scoring-knife 34, and by substituting other knives having the same width of body, but with different widths of cutting-faces, interchangeability is assured, and a recess of the desired length may be formed. Stated differently, hinge-butts are of various lengths, and therefore the machine, in virtue of the interchangeability of the front scoring-knives and of the slicing-knife and of the capability of adjustment of the side scoring-knives, is capable of producing recesses of the desired size longitudinally and of the requisite width.

It sometimes happens that it is desirable to give a certain amount of draft or inclination to the bottom of the recess in the material, and this can be accomplished by so adjusting the head or block carrying the slide upon the frame that the path of the slicing-knife may be changed angularly with relation to the other knives. This may be done by loosening the bolts 65 securing the block to the bed-plate and then interposing washers or shims 100 between said block and bed-plate at the end desired until the block is tipped to the required degree.

It will be seen that the center of the eccentric 28 is placed somewhat higher than the center of the rod or pin 71 of the slide to which the pitman 73 is connected, and the object of this is to diminish the angularity of the eccentric-rod, and hence the wear on the slide during the cutting-stroke. Should wear take place, however, it may readily be compensated for by the adjustable take-up gib $62^2$, bearing against the under side of the slide proper.

For the purpose of supporting and adjusting the work improved means are employed, which will now be described.

By reference to Figs. 1 and 2 it will be seen that the side bars 18 18' of the frame are provided with laterally-projecting perforated extensions 75 75' for the reception of the upper ends of sliding rods 76 76', and that the column or pedestal 6 is provided near its lower end with projecting brackets 77 77', perforated to receive the lower extremities of said rods, which extend for some distance below said brackets. Connected to these rods, near their upper ends, are split couplings 78 78', which are adjustably secured to the rods 76 76' by bolts 79 79', and projecting from and preferably cast integral with the split couplings 78 78' is a tie-plate 80. This tie-plate 80 is provided with a guide-way 83, in which is adjustably secured by bolts 84 a slide 85, said slide being slotted at 85' to receive the bolts 84 and having at its inner end a flat face $85^2$ to bear against the side of the work 86 and projecting from and overhanging said flat face lips or flanges $85^3$, which rest upon the top of said work. A similar tie-plate 87 also connects the split couplings 78', and in a guideway 87' of said tie-plate is fitted a slotted slide 88, through which a bolt 89 passes for adjustably securing said slide in position. At its inner end slide 88 is provided with a long plate or cross-bar 89', having a flange $89^3$, and projecting from this flange and constituting a vertical extension of the cross-bar a back $89^2$, against which the lower side of the material rests. By adjusting the split couplings 78 78' vertically on the rods 76 76' the slides 85 88 and their connected parts may be spaced the desired distance apart to adapt the devices to receive material of various widths, and by adjusting the slides in or out on the guideways of the tie-plates 80 87 the slicing-knife, side and forward scoring-knives, and the screw-hole-forming prods may be made to enter the material at the desired points. To illustrate, if it should be desired to form a comparatively wide recess in the door-stile or other work the slides 85 88 will be adjusted horizontally toward the slicing-knife, so that said knife will remove a slice of greater width at the termination of its stroke, and the prods and front scoring-knife will form the holes for starting the screws and the longitudinal score or incision at points nearer to the forward side of the work. These tie-plates 80 87 also serve to so unite the rods 76 76' that the whole constitutes a firm and rigid frame for carrying the work toward and from the cutters, and for reciprocating this frame any suitable mechanism, automatic or pedal, may be employed. In the illustration given the ends of the rods 76 76' rest upon the toes of lever-arms 90 90', projecting from a uniting cross-bar 91, each of said lever-arms being pivoted to the pedestal 6 at 92 92', and for actuating these lever-arms a treadle $92^2$, the arms 93 93' of which are pivoted to the sides of the base of the pedestal at 94, is employed, said arms of the treadle overlying the projecting ends of the cross-bar 91 and the front bar of the treadle carrying a foot-plate 95, as illustrated in Fig. 16. As will be obvious, when the treadle is depressed it will lower the rear ends of the lever-arms 90 90', and thereby cause the noses at the forward extremities of said arms to raise the rods 76 76' and through the parts above described carried by said rods force the work to position to receive the front scoring-knife and screw-hole-marking prods.

To regulate the extent to which the rods and work-supporting parts are elevated, a stop-screw 82, located in a lateral arm or bracket of the side bar 18', is provided, and for the purpose of lowering the work-supporting frame spiral springs 96 96' are placed around the rods 76 76', between the couplings 78 and the perforated brackets 75 75', as illustrated in Fig. 2. When the work-supporting frame is raised, these springs are compressed, and when the foot is withdrawn from the treadle the springs expand and force said frame downward.

Other means may be substituted for the springs or the springs may be omitted and gravity be depended upon for accomplishing this purpose, if desired.

My improved machine operates as follows: A door-stile or other piece of work is placed upon the flange 89' of the cross-bar 89, with its top surface beneath the lips or projections $85^3$ of the slide 85, and the foot is then applied to the treadle 95 to depress the same and cause the pivoted arms 93 93', to which the treadle is attached, to come into contact with the projecting ends 92 92' of the cross-bar 91 uniting the lever-arms, thereby rocking said lever-arms and causing the toes at their free forward ends to advance the rods 76 76', to which the work-support is secured, the movement of said work-support being limited by the stop-screw 82. After this result has been accomplished the lever 15 is actuated to shift the belt from the loose pulley 13 to the fast pulley 12, and, the machine being then in operation, lever 31 is rocked on its pivotal bolt 25 to cause the front scoring or incising knife 34 and the marking points or prods 39 to enter the work and form the front longitudinal score or incision and the starting-holes 97 for the screws or other devices by which the hinge-leaves are secured in position. The lever 49 is then rocked by cam 29 to cause the side scoring or incising knives 54 54' to score or incise the material at the ends of the portion thereof in which the recess is to be formed, the result being that the work is now scored around three sides of a rectangle. The side scorers are now withdrawn (the lips $85^3$ preventing the work from rising) and the slide 64, carrying the slicing-knife 67, is advanced by the eccentric 28 and its connections to cause said knife to enter the material and remove the portion thereof bounded by the scores or incisions made by the other knives. This slicing-knife is then withdrawn, the work is pushed along on its support, and the operations are repeated to form another recess. After one piece of work has been finished the foot is removed from the treadle and the work-support is forced downward by the springs 96 96', a new piece of work is placed in position, and the operation is repeated.

Variations in the sizes of recesses to be formed in the work may be made by substituting knives having the desired width of cutting edge for the front scoring and slicing knives, and, by shifting the heads carrying the side scoring-knives, the prods or marking-points may be differently arranged to produce the desired pattern.

While the incising-cutters, marking-prods, and work-support are shown as arranged for movement in certain specific planes, it is distinctly to be understood that the invention is not limited in this respect, for the parts may be differently located and arranged without departure from the scope thereof. So, too, the shapes of the cutters and marking-prods may be changed to form recesses of different designs in the material, if desired, and different kinds of work supporting and feeding devices may be substituted for those shown without departure from the invention.

Other means may also be substituted for actuating in proper sequential order the various parts of the machine, the invention not being limited to those shown, and the cutters may also be adjusted and secured in their places by various devices different from those illustrated.

While incising-knives and a slicing-knife are shown for operating upon the work, other kinds of cutters suitable for accomplishing the purpose may be substituted for said knives without departure from the invention.

Having thus described my invention, what I claim is—

1. The combination, with a front scoring-cutter, of side scoring-cutters, operated independent of said front scoring-cutter; means for removing the material to form a recess therein between the scored or incised portions; means for actuating the front scoring-cutter; and means for actuating the side scoring-cutters.

2. The combination, with independently-operative front and side scoring or incising devices, of means for removing material from between the scores or incisions made by said devices, and devices for marking the work.

3. The combination, with independent front and side scoring or incising knives, of means for actuating the front scoring-knife; means for actuating the side scoring-knives subsequent to the action of the front scoring-knife; and a cutter for removing material from between the scores or incisions made by said knives.

4. The combination, with a work-support, of means for incising material at the sides; means independent of said side scoring means for incising the material at the front; mechanisms for actuating the independent scoring devices at different times; and means for removing the material between the incised portions thereof.

5. In a recessing-machine, the combination, with a work-support, of a front scoring-cutter; side scoring-cutters independent from said front scoring-cutter; means for actuating said cutters at different times; a cutter for removing material from between the incisions made by said side and front cutters; and means for actuating said material-removing cutter.

6. In a recessing-machine, the combination, with a work-support, of a front scoring-knife; means for actuating said front scoring-knife; side scoring-knives; means whereby said side scoring-knives may be adjusted toward and from each other; means for actuating said side scoring-knives subsequent to the action of the front scoring-knife; a slicing-knife for removing the material from between the incised portions of the work; and means for actuating said slicing-knife.

7. In a recessing-machine, the combination, with a front scoring-knife; side scoring-knives independent of the front scoring-knife and operated at a different time therefrom; means for removing the material from between the incisions made by said knives; mechanisms for actuating said knives; a movable work-support; and means for actuating said work-support.

8. In a recessing-machine, the combination, with a work-support, of a front scoring-knife; side scoring-knives independent of the front scoring-knife and operative at a different time therefrom; a movable support for said side scoring-knives; means for adjustably securing said knives to the support; and means for actuating the front and side scoring-knives.

9. In a recessing-machine, the combination, with a work-support, of a head; means for reciprocating one of said parts with relation to the other; a front scoring-knife carried by the head; indenting points or prods also carried by the head; side scoring-knives; and means for removing the material from between the incisions made by said front and side scoring-knives.

10. The combination, with a head, of a work-support; means for reciprocating one of said parts with relation to the other; a front scoring-knife carried by said head; marking-tools also carried by the head; side scoring-knives; and means for actuating said side scoring-knives.

11. The combination, with a head, of a work-support; means for reciprocating one of said parts with relation to the other; a front scoring-knife carried by said head; and a marking-tool carried by the head and adapted to form a recess in the material on the work-support.

12. The combination, with a head, of a front scoring-knife secured thereto; a series of marking points or prods carried by said head; a work-support; and means for reciprocating said work-support.

13. The combination, with a perforated head, of a front scoring-knife secured thereto; marking points or prods located in the perforations of said head; means for adjusting said marking points or prods; a work-support; means for actuating said work-support; side scoring-knives; and means for removing material from between the scores made by said knives.

14. The combination, with a head having perforations, of a work-support; means for reciprocating one of said parts with relation to the other; marking points or prods located in the perforations of the head; means for scoring or incising the material; and means for removing the material from between the scores or incisions therein.

15. The combination, with a front scoring-cutter, of side scoring or incising cutters independent thereof; means for actuating the side scoring-cutters at a period different from that of the action of the front scoring-cutter; a work-support; means for actuating said work-support; a slicing-knife; and means for actuating said knife.

16. The combination, with a movable lever having a head, of a front scoring-cutter mounted in said head; a movable work-support; side scoring-cutters; a rocking support on which said cutters are mounted; means for actuating said support; a cutter for removing the material between the incised portions thereof; and means for actuating said cutter.

17. The combination, with a movable lever having a head, of a work-support; means for reciprocating said work-support; a cutter carried by the head and having its working surface of less width than its body portion; and means carried by the head for holding an appropriate number of marking-tools.

18. In a machine of the class specified, the combination, with a work-support, of a front scoring-knife; a lever carrying said knife; means for actuating said lever; a grooved block carried by the lever; a series of resilient strippers the ends of which enter the grooves in said block; a series of marking-tools carried by the block; a pivoted head; means for actuating said head; and side scoring-tools adjustably mounted on the head.

19. The combination, with a head and with means for actuating said head, of a front scoring-knife carried by the head; a series of marking prods or points also carried by the head; a work-support; and a series of resilient strippers secured to a stationary support and coöperating with the tools carried by the head.

20. In a machine of the class specified, the combination, with a head, of a front scoring-knife adjustably mounted in said head; a block having longitudinal grooves and perforations secured to the head; marking prods or points adjustably mounted in the perforations of the block; and resilient strippers having deflected portions coöperating with the grooves in the block, said strippers being secured to a stationary support.

21. The combination, with a head, of a work-support; means for reciprocating one of said parts with relation to the other; a scoring-knife mounted in the head; means for positively adjusting said knife; side scoring-knives independent of the head scoring-knife; means for actuating said side scoring-knives subsequent to the action of the other scoring-knife; a knife for removing material from between the incised portions of the work; and means for actuating said knife.

22. The combination, with a work-support, of a rocking head having a guideway; means for actuating said head; side scoring-cutters adjustable to vary their distance apart upon said guideway; means for clamping said cutters in position after they have been adjusted; a front scoring-cutter; and a cutter for removing the material between the incised portions of the work.

23. The combination, with a work-support, of means for reciprocating said work-support; a head located over the work-support; a front scoring-knife carried by the head; side scoring-knives independent of the front scoring-knife; means for actuating said knives subsequent to the action of the front scoring-knife; a reciprocating slicing-knife for removing the material from between the incised portions thereof; and an eccentric for actuating said knife.

24. The combination, with a work-support, of means including a treadle for reciprocating said work-support; guiding means for the work-support; a movable head and means for actuating the same; a front scoring-knife carried by said head; side scoring-knives; a support independent of the head upon which said knives are mounted; means for actuating said support; a slicing-knife; and means for actuating said slicing-knife.

25. The combination, with framework, of a movable head; means for actuating said head; a front scoring-knife adjustably mounted in said head; a work-support; guide-rods secured to said work-support and movable on the frame; means for actuating said guide-rods; side scoring-cutters; a support independent of the head and carrying said cutters; means for actuating said support; a cutter for removing material from the work between the scores or incisions therein; and means for actuating said cutter.

26. The combination, with a work-support, of guide-rods secured to said support; levers for actuating said guide-rods; a treadle for actuating the levers; a head; a front scoring-cutter secured to said head; a support; side scoring-cutters carried by the support; a cutter for removing the material from between the incised portions of the work; and means for actuating said cutter.

27. The combination, with a work-support having a bar upon which the work is sustained and a lip bearing upon the top of the work, of means for reciprocating said work-support; a front scoring-cutter; means for actuating said cutter; side scoring-cutters; means for actuating said cutters at a time different from the action of the front scoring-cutter; and a cutter for removing the material from between the scores or incisions.

28. In a machine for forming recesses in wood, the combination with a work-support, of means for actuating said work-support; a movable front scoring-knife; movable side scoring-knives; means for actuating said front scoring-knife; independent means for actuating said side scoring-knives; a slicing-knife for removing material from between the scored or incised portions of the work; means for actuating said slicing-knife; and means for so adjusting said knife that it will form the bottom of the recess in the work at the desired angle.

29. The combination, with cutters independently operative for scoring or incising work, of a work-support; a cutter for removing material from between the incised portions of the work; a cutter-slide; a block in which the cutter-slide reciprocates; means for actuating said cutter-slide; and means for adjusting said block so that the cutter will enter the work at the desired angle.

30. The combination, with a work-support, of a head having grooves, one of said parts being movable relatively to the other; tools carried by the head; and yielding strippers secured to a stationary support bearing against the work and entering the grooves of the head.

31. The combination, with a work-support, of lever mechanism for actuating said work-support; means for laterally adjusting the work-support; a front scoring-knife; a lever to which said front scoring-knife is secured; means for actuating said lever; side scoring-knives; means for actuating said knives; and means for removing the material from between the incisions made by said front and side scoring-knives.

32. The combination, with a work-support, of a pivoted lever having a head, said head being split and channeled; a knife located in the channel of the head; means for securing the knife in position by contracting the split portion of the head; means for actuating the lever; a grooved and perforated block carried by the head; marking points or prods secured in the perforations of the block; and a pair of resilient strippers secured to a stationary support, the ends of said strippers entering the grooves of the block.

33. The combination, with a work-support, of a pivoted lever having a split head and a channel with inclined side walls; a front scoring-knife located in said channel; means for clamping the knife in position; means for positively adjusting the knife; a grooved and perforated block secured to the head in front of the knife; marking points or prods fitted in perforations of the block; a stationary support and bolts passing through the slots of the strippers and serving to adjustably secure them to said support.

34. The combination, with a work-support, of a pivoted lever carrying a head, said head having a channel; a knife located in the channel of the head; means for clamping said knife in position; means for positively adjusting the knife; marking points or prods carried by the head; and an eccentric and its connections for actuating the lever.

35. The combination, with framework having a pair of separated side frames with ends overhanging said framework, of a bolt uniting the free, overhanging ends of said side frames; a lever pivoted on said bolt and having a head intermediate its length; a knife adjustably mounted on said head; a driving-shaft carrying an eccentric; and a connection between the strap of said eccentric and the free end of said lever.

36. The combination with a reciprocating work-support, of means for laterally adjusting said work-support; a front scoring-knife; means for actuating said knife; side scoring-knives operated independently of the front scoring-knife; and means for actuating said side scoring-knives.

37. The combination, with a work-support, of lever mechanism for actuating said work-support; means for laterally adjusting the work-support; a front scoring-knife; a lever to which said front scoring-knife is secured; marking points or prods carried by the lever; side scoring-knives; means for actuating said knives; and means for removing the material from between the incisions made by the front and side scoring-knives.

38. The combination, with a work-support, of a pivoted lever; means for actuating said lever; a longitudinally-perforated block secured to the lever; marking points or prods mounted in the perforations of the block; and a front scoring-cutter carried by the lever.

39. The combination, with a work-support, of a longitudinally-perforated block; means for actuating said block; marking points or prods adjustably mounted in the longitudinal perforations of the block; means for making scores or incisions in the material upon the work-support; and means for removing the material between said scores or incisions.

40. The combination, with a work-support, of a pivoted lever; a front scoring-knife carried by the lever; a block secured to the lever; marking points or prods carried by the block; means for actuating the pivoted lever; side scoring-knives; means for actuating said knives; a slicing-knife; and means for actuating said slicing-knife.

41. The combination, with a work-support, of means for actuating said work-support; means whereby the work-support may be laterally adjusted; a pivoted lever; a front scoring-knife and marking points or prods carried by the lever; adjustable side scoring-knives; means for actuating the side scoring-knives; means for actuating the pivoted lever; an adjustable slicing-knife; and means for actuating said slicing-knife.

42. The combination, with a base-plate, of side frames having overhanging ends; a lever pivoted in said ends; an eccentric and connections for actuating said lever; a front scoring-knife carried by the lever; means for positively adjusting said knife; side scoring-knives; means for positively adjusting the side scoring-knives; means for actuating the side scoring-knives; a slicing-knife for recessing the material between the incisions made by the front and side scoring-knives; and means for actuating said slicing-knife.

43. The combination, with a work-support, of mechanism for reciprocating said work-support; a pivoted lever; a front scoring-knife carried by said lever; means for actuating the lever; side scoring-knives; a guideway upon which the blocks carrying said side scoring-knives may be laterally adjusted to set said knives the desired distance apart; means for actuating the guideway; a slide; a slicing-knife carried by said slide; and means for actuating said slicing-knife.

44. The combination, with a work-support, of means for reciprocating said work-support; a pivoted lever having a head; a front scoring-cutter adjustably mounted in a channel of said head, said cutter having a slot; a screw having a projection fitted in the slot of the cutter; side scoring-cutters independent of the front scoring-cutter; means for actuating said cutters; and means for removing the material from between the incisions made by the scoring-cutters.

45. In a recessing-machine, the combination, with a pivoted lever having a depending head, of a front scoring-cutter secured to said head; a work-support; a block secured to the head of the lever over said front scoring-cutter; marking points or prods adjustably fitted in the block; side scoring-cutters; means for actuating said cutters; and means for removing the material from between the incisions made by the front and side scoring-cutters.

46. The combination, with a work-support, and with means for actuating said work-support, of means for longitudinally incising the work; independent means for incising the work at an angle to the longitudinal incisions; means for actuating said independent means at a time different from the time of action of the means for longitudinally incising the work; and means for removing that portion of the work located between the incisions.

47. In a recessing-machine, the combination, with framework, of a pair of guide-rods mounted for reciprocation on said framework; pivoted levers upon which the ends of said guide-rods rest; a cross-bar connecting said levers so that they will move in unison; a pivoted treadle the lever-arm of which is in contact with said cross-bar; a work-support carried by the guide-rods; and front and side scoring-cutters for incising the material carried by said work-support, the side scoring-cutters operating independently of said front scoring-cutter.

48. In a recessing-machine, the combination, with a pedestal having laterally-projecting perforated brackets adjacent to its upper and lower ends, of guide-rods mounted in said brackets; means for uniting said guide-rods; a work-support secured to the upper ends of said guide-rods; pivoted levers upon the ends of which the lower extremities of the guide-rods bear; a connection for uniting said levers so that they will move in unison; a lever pivoted at its rear end to the pedestal and bearing upon said connection; a treadle carried by the lever; and means for incising the work carried by the work-support.

49. In a recessing-machine, the combination, with a pedestal, of an adjustable block located on the top of said pedestal; a slide reciprocatory in said block; a slicing-cutter carried by the slide; means for actuating said slicing-cutter; a work-support; a front scoring-cutter; side scoring-cutters independent of the front scoring-cutter; means for actuating the front scoring-cutter; and mechanism for actuating the side scoring-cutters after the action of said front scoring-cutter.

50. In a recessing-machine, the combination, with a pivoted lever having a head, of a cutter carried by said head; marking points or prods; a perforated block in the perforations of which said marking points or prods are located, said block having grooves in its face; resilient strippers entering said grooves; means for scoring the material at an angle to its length; and means for removing the material from between the scores made therein.

51. In a recessing-machine, the combination, with pivoted lever having a head, of a front scoring-cutter adjustably mounted on said head; a longitudinally-grooved block secured to the head in front of said scoring-cutter; marking points or prods carried by the block; and a stripper secured to the frame and having a portion entering the groove in said block.

52. In a recessing-machine, the combination, with a movably-mounted device, of a front scoring-cutter carried by said device; a longitudinally-grooved block secured to said device over said scoring-cutter; marking points or prods adjustably mounted in the block; and resilient strippers secured to the frame and having portions in contact with the rear walls of the grooves in said block.

53. In a recessing-machine, the combination, with a base-plate having side frames projecting vertically therefrom and overhanging the forward edge of said base-plate, of a bolt uniting the overhanging ends of said side frames; a lever sleeved upon said bolt and having a head; a front scoring-cutter adjustably mounted in a channel of said head; a longitudinally grooved and perforated block secured to the head over said front scoring-cutter; marking points or prods adjustably mounted in the perforations of the block; resilient strippers having bowed portions fitted in the grooved portions of the block; a work-support; cutters for incising the material at an angle to the incision made by the front scoring-cutter; and means for removing the material from between the incisions made by said incising-cutters.

54. In a recessing-machine, the combination, with a work-support, of a rocking lever having a guideway of dovetail shape on its upper surface; blocks adjustably mounted on said guideway; means for clamping said blocks to the guideway when adjusted to the desired distance apart; side scoring-cutters carried by the blocks; means for actuating the rocking lever; a front scoring-cutter; and means for removing the material from the work to form a recess therein between the incisions made by said cutters.

55. In a recessing-machine, the combination, with framework, of side bars secured to the top of said framework; a work-support; a lever pivoted to the side bars; a front scoring-knife carried by the lever; a longitudinally grooved and perforated block also carried by the lever; marking points or prods located in the perforations of the block; a rocking lever carrying a guideway; means for actuating said lever; blocks adjustable laterally upon said guideway; side scoring-cutters adjustably mounted in the blocks; a reciprocatory slide; means for reciprocating said slide; and a slicing-cutter carried by the slide.

56. In a recessing-machine, the combination, with a work-support, of guide-rods supporting said work-support; tie-plates connecting said guide-rods and clamped thereon; a guideway on one of said tie-plates; a slide to which the work-support is secured fitted in the guideway; and means for recessing the work upon said work-support.

57. The combination, with guide-rods fitted to slide in the frame, of a tie-plate uniting said guide-rods near their upper ends and clamped thereto, said tie-plate having a guideway; a slide carrying a work-support adjustable in said guideway; means for recessing the work; and a device bearing upon the top of the work while the recessing means are in operation.

58. In a recessing-machine, the combination, with a work-support, of means for laterally adjusting said support; means for reciprocating said support; a front scoring-cutter; means for actuating said cutter; side scoring-cutters operative independently of the front scoring-cutter; means for actuating said cutters; a slicing-knife; and means for actuating said knife.

59. In a recessing-machine, the combination, with a work-support, of a front scoring-cutter having a beveled cutting edge of less width than the blade of said cutter; a pivoted lever in which said front scoring-cutter is adjustably mounted; side scoring-cutters operative independently of the front scoring-cutter; means whereby said side scoring-cutters may be adjusted and then clamped in position at the desired distance apart; a slide carrying a slicing-knife; means for longitudinally adjusting said slicing-knife; and means for reciprocating the slide.

60. In a recessing-machine, the combination, with a driving-shaft, of a sleeve secured to said shaft and carrying a cam and eccentrics; a lever pivoted in the frame and actuated by one of the eccentrics; a front scoring-knife carried by said lever; marking points or prods also carried by the lever; a pivoted lever having a rearwardly-extending arm adapted to be actuated by said cam, said lever being provided with a transverse guideway; heads adjustably secured to said guideway; side scoring-knives mounted in the heads; a slide; a slicing-knife carried by the slide; and connections from the slide to the other eccentric.

61. In a recessing-machine, the combination, with a work-support, of a front scoring-cutter; side scoring-cutters operative independently of the front scoring-cutter; means for actuating said front and side scoring-cutters; a slide; a slicing-cutter secured to said slide; a rod or pin carried by the slide; a pitman secured to the rod or pin; and means for actuating the pitman.

62. In a recessing-machine, the combination, with incising-cutters, and with means for actuating said cutters, of a slide carrying means for supporting the work; means whereby said slide may be adjusted and then secured in position; a second slide having means for bearing upon the top of the work; means whereby said second slide may be adjusted and then secured in position; means for actuating the slides to carry the work into position to be operated upon by the incising-cutters; and a cutter for removing that portion of the work located between the incisions made therein by said incising-cutters.

63. In a recessing-machine, the combination, with cutters for incising the work, of means for actuating said cutters; an adjustable slide; a bar upon which the work is supported carried by said slide; a second slide parallel to the first slide and carrying means which rest upon the top of the work and clamp it at an angle to the slides; means whereby said slides may be adjusted horizontally and vertically and then secured in position; and means for reciprocating the slides.

64. In a recessing-machine, the combination, with a pair of rods, of means for reciprocating the rods; a tie-plate uniting said rods and having a guideway; a slide fitted in said guideway; means whereby said slide may be adjusted and then secured in position; means carried by the slide for supporting the work; means for incising the work at the front; independent means for incising the work at the sides of the front incision; and means for removing that portion of the work located between the incised portions thereof.

65. In a recessing-machine, the combination, with a pair of rods, of brackets secured to the frame and in which said rods are mounted; means for reciprocating said rods; a tie-plate uniting the rods and having a guideway; a slide adjustably mounted in the guideway and carrying a work-supporting bar; a second tie-plate uniting the rods at one side of the first tie-plate, said second tie-plate also having a guideway; a slide adjustably mounted in the guideway of said second tie-plate and carrying means for sustaining the work; cutters for incising the work; and a cutter for removing that portion of the work located between the incisions therein.

66. In a recessing-machine, the combination, with a pair of rods, of perforated brackets secured to the frame, and in which said rods are mounted; levers for actuating said rods; means for actuating said levers; tie-plates uniting the rods and each having a guideway; slides adjustably mounted in the guideways of said tie-plates; means carried by said slides for supporting the work at different points; means for incising the work; and means for removing that portion of the work located between the incisions therein.

67. In a recessing-machine, the combination, with a pedestal having perforated brackets, of rods mounted in said brackets; tie-plates clamped to said rods and adjustable longitudinally thereof; means for reciprocating the rods; slides carried by the tie-plates and adjustable thereon; means carried by said slides for supporting the work; a front scoring-cutter; side scoring-cutters; and a cutter for removing material from between the incisions made by said cutters.

68. In a recessing-machine, the combination, with a pair of slides carrying means for supporting and sustaining work, of means whereby said slides may be adjusted; means for reciprocating the slides to bring the work into position for operation; independently-operative cutters for incising the work; and a cutter for removing that portion of the work between the incisions therein.

69. The combination, with framework, of a work-support; a pivoted lever having a guideway; blocks adjustably secured to said guideway; side scoring-cutters mounted in the blocks, each of said cutters having a slot; screws having portions fitted in the slots of the cutters, said screws serving positively to adjust the cutters back and forth; a front scoring-cutter; means for actuating said front scoring-cutter; a slicing-cutter; and means for actuating said slicing-cutter.

70. The combination, with a movable device having a guideway of dovetail shape, of a block having a groove with inclined walls; a double-wedge gib secured between one side of the guideway and one of the inclined walls of said groove in the block; a cutter carried by the block; and means for adjusting said cutter.

71. The combination, with framework having side bars, of a rod uniting said side bars; heads adjustably secured to said rod; resilient strippers carried by the heads; a work-support; cutters for incising the work; and a cutter for recessing the work between the incisions therein.

72. The combination, with framework having side bars; of a rod uniting said side bars; heads having grooved faces adjustably secured to said rod; strippers adjustably secured in the grooves of the heads; a work-support; a front scoring-cutter; side scoring-cutters; and a cutter for recessing the work between the incisions made therein by the front and side scoring-cutters.

73. The combination, with a work-support, of means whereby said work-support may be adjusted vertically and horizontally; means for reciprocating the work-support; incising-knives; means for actuating said knives; marking points or prods for forming screw-hole-starting recesses in the work; a slicing-knife; and means for actuating said slicing-knife.

74. In a recessing-machine, the combination, with a work-support, of means for actuating said work-support; a lever having a head; a front scoring-knife carried by said head; an externally-grooved block secured to the head over the front scoring-knife; marking points or prods carried by the block; strippers, portions of which are received in the grooves of the block; side scoring-knives; means for actuating said knives; a slicing-knife; and means for actuating said slicing-knife.

75. In a recessing-machine, the combination, with a work-support, of incising-cutters; marking points or prods; means for actuating said cutters and prods; resilient strippers; a slicing-cutter; and means for actuating said slicing-cutter.

76. In a recessing-machine, the combination, with a work-support, of cutters for incising the work at different points; a cutter for recessing the work between the incised portions thereof; a slide carrying said cutter; a block in which the slide reciprocates; an eccentric and connections for actuating the slide; and means for adjusting the block in which said slide reciprocates.

77. In a recessing-machine, the combination, with a work-support, of a front scoring-knife; side scoring-knives, each having a diagonal cutting end, heads in which said side scoring-knives are edgewise supported; means for rocking said heads; a cutter for recessing the material between the incisions made by the front and side scoring-knives; and means for actuating said cutter.

ROBERT S. BROWN.

Witnesses:
  J. L. EDWARDS, Jr.,
  HENRY BISSELL.